Nov. 17, 1959     W. A. SCHMALL ET AL     2,913,563
FLASHER UNIT FOR COOKING APPLIANCE
Filed Aug. 20, 1956     2 Sheets-Sheet 1
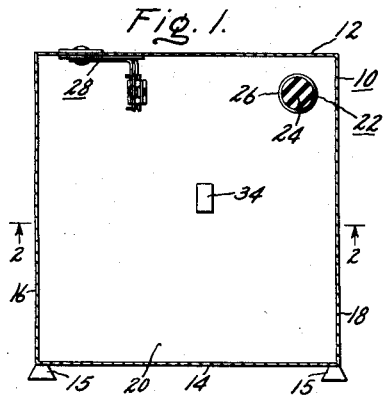
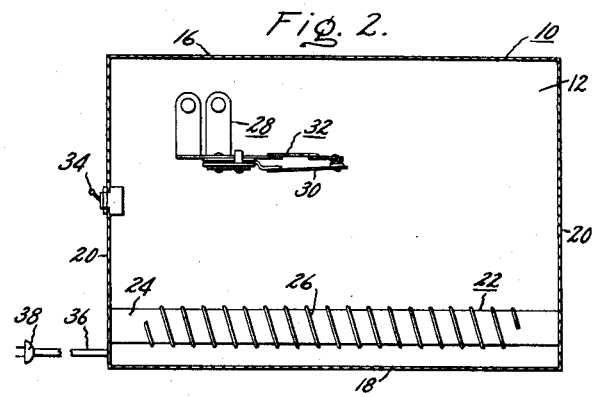
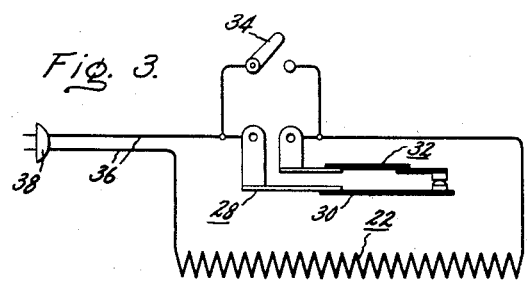
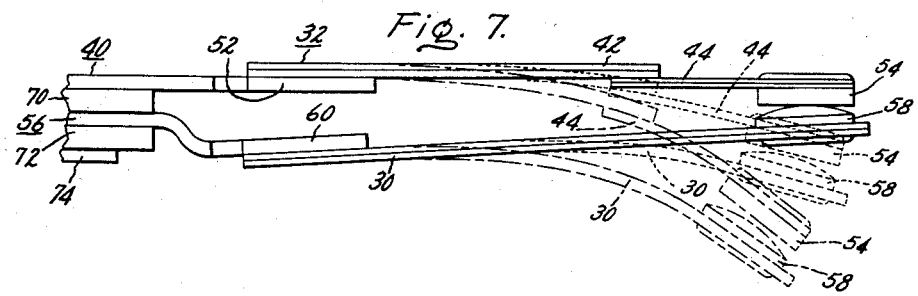
*Inventors:*
*Wilbur A. Schmall,*
*Paul M. Kropp, Jr.*
*by Armand Cifelli*
*Their Attorney.*

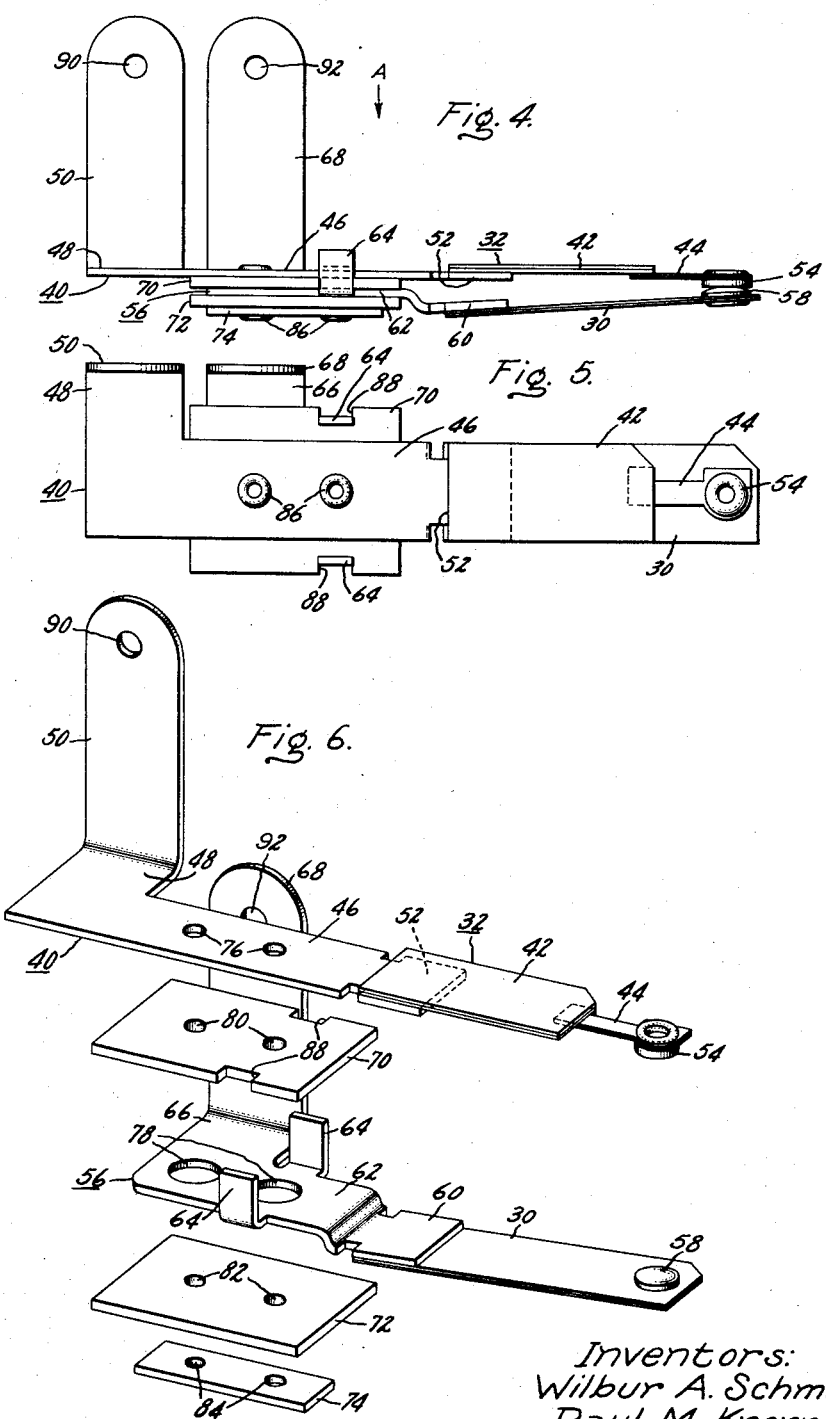

United States Patent Office 2,913,563
Patented Nov. 17, 1959

2,913,563

FLASHER UNIT FOR COOKING APPLIANCE

Wilbur A. Schmall, Allentown, and Paul M. Kropp, Jr., Bethlehem, Pa., assignors to General Electric Company, a corporation of New York Application August 20, 1956, Serial No. 605,036

7 Claims. (Cl. 219—20)

This invention relates to means for selectively controlling an electrical heating unit, such as those utilized in electrical cooking appliances, to either continuously or intermittently energize it. When the invention is utilized in an electrical cooking appliance, continuous energization causes the heating unit to function as cooking means, and intermittent energization causes the heating unit to function as warming means. In the latter situation, the control means automatically responds to the heat in the appliance to intermittently energize the heating unit to maintain the temperature in the appliance at a preselected level which is calculated to warm objects placed therein without cooking them. For clarity and simplicity, the invention will be described as incorporated in an electrical cooking appliance; however, other applications of the invention will be apparent to those skilled in this art.

In the electrical cooking appliance art it is frequently desirable to employ a single electrical heating unit for multiple purposes, for example, in appliances having a food cooking oven it is desirable to be able to selectively utilize the same electrical heating unit to either cook food objects placed in the oven or to keep food objects warm that are placed in the oven. For purposes of this application, the distinction between "cooking" and "warming" is that in the former, the food object is toasted, broiled, baked or the like, whereas in the latter, a food object is just kept warm. It is manifestly clear to housewives that it is often desirable to use an oven to cook food, and that at other times it is desirable to use an oven to warm food. Frequently both cooking and warming functions are performed in the oven of an electric range which has a control which is designed to effect both functions. Such range controls are rather complex structures; hence, expensive to manufacture. Furthermore, due to their nature, they do not always lend themselves to convenient incorporation in small portable appliances, such as broilers, toasters and the like. Lastly, such ranges do not normally have just one heating unit, but usually have a separate cooking heating unit and a separate warming heating unit.

It is an object of this invention to provide a control for an electrical heating unit which selectively permits either continuous or intermittent energization of the heating unit.

It is a further object of this invention to provide a control of the type mentioned in the preceding paragraph in an electrical cooking appliance, to thereby permit the heating unit in the cooking appliance to function to selectively either cook or warm objects placed in the appliance.

It is a still further object of this invention to provide a control for a cooking appliance as set forth in the preceding paragraph wherein: (1) when functioning to warm objects, the heating unit cycles about a predetermined warming temperature, but such cycling is not rapid enough to produce objectionable radio noises; (2) when functioning to warm objects, the "On" periods of the heating unit during initial warming operation are maintained at a minimum in order that the heating unit will not be energized continuously long enough during any of such periods to cook objects rather than merely to warm them, and (3) slow engagement and disengagement of the contacts is eliminated, thereby preventing arcing between the contacts, and eliminating the consequent deleterious effect on the life of the contacts and the objectionable radio noises.

The objects of this invention are accomplished in one form by providing a control in an electrical cooking appliance which includes a single electrical heating unit, wherein the control comprises a flasher and a manual switch, and the latter operates when opened to allow the flasher to control (intermittently energize) the heating unit, and the latter operates when closed to short out the flasher and allow the heating unit to be energized continuously. Further, wherein the flasher comprises a principal bimetallic member which carries an electrical contact and reacts principally to the heat emitted directly from the heating unit, and a bimetallic compensating assembly which carries an electrical contact, which reacts principally to the ambient heat in the appliance, and which includes two members. The first member of the bimetallic compensating assembly is selected of a material which is active up to a certain temperature, and thereafter does not deflect further on a further increase in temperature. The flasher functions to intermittently energize the heating unit as the ambient temperature in the appliance sequentially rises from initial cold condition to the preselected warming temperature in such a manner that the heating unit is not "On" continuously for a long enough period of time to cook objects, particularly during the initial periods. The second member of the bimetallic compensating assembly carries the electrical contact, is substantially smaller in cross-section than the first member, and is made of a material which has a high coefficient of electrical resistivity, so that a considerable amount of self-heating is obtained when current flows through the second member. The second member operates to effect quick engagement and disengagement of the contacts, because when the contacts are engaged and current flows through it, it is self-heated and deflects in a direction to move the contact which it carries into "closer" engaged position with the contact carried by the principal bimetallic member. When the principal bimetallic member receives a sufficient amount of heat to deflect and move its contact away from the contact carried by the second member, the current ceases to flow through the second member, which thereby cools rapidly and undeflects, resulting in a quick increase in the gap between the contacts. When the principal bimetallic member has cooled sufficiently for the contacts to engage again, the second member increases in temperature the instant current flows through it, and thereby moves its contact further toward the engaged position, thus insuring a good electrical connection.

Other objects and further details of that which we believe to be novel and our invention will be clear from the following description and claims taken with the accompanying drawing wherein:

Fig. 1 is a sectional view, somewhat schematic, which is taken in a vertical plane which passes through an electrical cooking appliance that incorporates the invention;

Fig. 2 is a sectional view taken substantially on line 2—2 of Fig. 1;

Fig. 3 is a wiring diagram which illustrates the circuitry of the appliance;

Fig. 4 is an elevation view of the flasher when it is incorporated in a cooking appliance in the general manner illustrated in Figs. 1 and 2; with reference to Figs. 1 and 2 orientation, this view constitutes a bottom elevation view of the flasher;

Fig. 5 is a front elevation view of the flasher; stated differently, it is an elevation view looking in the direction of the arrow "A" in Fig. 4;

Fig. 6 is an exploded view of the flasher; and

Fig. 7 is a schematic diagram which illustrates the operation of the flasher from an initial cold condition to the point when the preselected operating warming temperature is reached in the cooking appliance.

Figs. 1 and 2 illustrate somewhat schematically an electrical cooking appliance 10 which incorporates the invention. The cooking appliance comprises a casing having a top wall 12, bottom wall 14, front wall 16, rear wall 18, and side walls 20. Mounted on the underside of the top wall 12 in a conventional manner is an electrical heating unit 22, in the form of an elongated electrical insulating rod 24 having an electrical resistance wire 26 wrapped about it. The top wall 12 of the casing also supports the flasher which is generally designated by reference numeral 28 and which will be described in detail subsequently. For the present, however, it is important to note that the flasher 28 constitutes a thermally responsive, electrical switch for automatically controlling the heating unit circuit, and that it generally comprises a principal bimetallic member 30 and a bimetallic compensating assembly 32 which carry electrical contacts, and further that the flasher is mounted in the casing in such a manner that the principal bimetallic member 30 faces the heating unit 22 and responds principally to heat emitted directly from the heating unit, and the bimetallic compensating assembly 32 is shielded from the heating unit and principally responds to ambient heat. In the preferred embodiment, the principal bimetallic member is disposed between the heating unit and the bimetallic compensating assembly, and shields the latter from the former. Other arrangements could be devised; however, the illustrated one is particularly effective.

The cooking appliance casing also supports in any conventional manner a conventional manual switch 34 and a conventional electric cord 36 which has a plug 38 at its free end. The cooking appliance illustrated in Figs. 1 and 2 is appropriately wired to effect the circuitry illustrated in the wiring diagram of Fig. 3. The wiring is such that upon insertion of the plug 38 into a conventional source of electricity, the heating unit 22 is energized in either one of two manners. If the manual switch 34 is closed, the flasher 28 is shorted out of the circuit and, therefore, electricity flows continuously to the heating unit 22 and the latter generates heat continuously; this is the cooking condition, and the heating unit will cook objects placed in the appliance. If the manual switch 34 is opened, as is illustrated schematically in Fig. 3, the flasher is included in the circuit to the heating unit 22, and it functions in a manner to be subsequently described in detail, to intermittently energize the heating unit 22 from an initial cold condition up to the preselected warming temperature for the oven; this is the warming condition, and the heating unit warms objects placed in the appliance.

The construction and operation of the flasher 28 is the central aspect of the control, and it is illustrated in great detail in Figs. 4, 5 and 6. As was mentioned, the flasher constitutes a thermally responsive, electric switch for automatically controlling the heating circuit. The flasher comprises the referred-to principal bimetallic member 30, and the bimetallic compensating assembly 32, each of which carries an electrical contact and, therefore, comprises a thermally responsive, current carrying switch blade, and associated parts.

The bimetallic compensating assembly 32 comprises the bracket 40, the first bimetallic member 42 and the second bimetallic member 44. The bracket 40 comprises a main, flat wall portion 46 which at one end has an L portion 48 which extends to one side and culminates in an upstanding wall portion 50. The other end 52 of the bracket portion 46 is reduced and is secured to an end of the first bimetallic member 42, as by welding or the like. The other end of first bimetallic member 42 is secured to one end of the second bimetallic member 44, as by welding or the like. The other end of the second bimetallic member 44 supports an electrical contact 54.

The principal bimetallic member 30 supports an electrical contact 58 at one of its ends, and at its other end, the member 30 is secured to mounting portion 60 of the bracket 56 as by welding or the like. The bracket 56 comprises a main, flat wall portion 62 which is offset from the mounting portion 60, and which includes a pair of opposed, upstanding tabs 64 and an L portion 66 which extends to one side and culminates in the upstanding wall portion 68. The remainder of the flasher comprises the insulators 70 and 72, and the plate 74. From Fig. 6 it will be observed that the brackets 40 and 56, the insulators 70 and 72, and the plate 74 each have a pair of aligned openings which are respectively designated by reference numerals 76, 78, 80, 82 and 84. Openings 78 in the bracket 56 are larger than the other openings, which are all of the same general size, to allow for clearance of the pair 86 of rivets which assemble the flasher parts together (see Fig. 4). To assemble these parts, with reference to Fig. 6, the insulator 70 is positioned on top of the bracket 56 in such a manner that its notches 88 partially surround the tabs 64 on the bracket 56. The bracket 40 is then positioned on top of insulator 70, and the insulator 72 and plate 74 are respectively placed below the bracket 56. When fully assembled with the rivets 86 passing through the openings in the parts and the rivet ends deformed to secure the parts together, the parts will be disposed, as illustrated in Figs. 4 and 5. It will be observed in Fig. 4 that the parts are united into a unitary flasher assembly, and that the contacts 54 and 58 are contiguous with each other. The upstanding wall portions 50 and 68 comprise electrical terminals to which electrical wires may be connected, and they respectively have the openings 90 and 92 formed in them which facilitate mounting the entire flasher in an appliance.

The relative size, shape, disposition, and specific material of the bimetallic members in the flasher are very important. With reference to Fig. 4 it will be seen that each of the bimetallic members 30, 42 and 44 is disposed with its high expansion side on its upper side; therefore, upon an initial increase in temperature, each of these bimetallic members will deflect in such a manner that its free end (the end which is not rigidly supported by another member) deflects downwardly. In the case of principal bimetallic member 30, the free end is the end which carries the electrical contact 58. In the case of the first bimetallic member 42, the free end is the end which is secured to the second bimetallic member 44, and in the case of the second bimetallic member 44, the free end is the end which supports the electrical contact 54. The principal bimetallic member 30 is of a length which is equal to or greater than the combined length of the first and second bimetallic members. The width of the principal bimetallic member is at least as great as the width of the first bimetallic member, which in turn is considerably wider than the second bimetallic member. The first bimetallic member 42 is made of a bimetallic material which is active only up to a certain predetermined temperature, and which thereafter does not deflect further with a further increase in its temperature. Such materials are commercially available, and one of them is currently marketed by the General Plate Company, a division of Metals and Controls Corporation, under the trade name "True Flex N1." The second bimetallic member 44 is considerably shorter and narrower than the first bimetallic member, and it has a smaller cross-section. Further, it is selected of material which has a high coefficient of electrical resistivity, such that a considerable amount of self-heating is effected when current flows through it.

From a review of Fig. 4, it will be seen that in the flasher, when the contacts 54 and 58 are engaged, the current flows through both brackets 40 and 56, the principal bimetallic member 30, the bimetallic compensating assembly 32, namely, the first bimetallic member 42 and the second bimetallic member 44, and the electrical contacts 54 and 58. As was stated earlier, the flasher is mounted in a cooking appliance in such a manner that the principal bimetallic member 30 faces the heating unit and shields the bimetallic compensating assembly 32 from the heat directly emitted from the heating unit.

Starting with a cold appliance and, hence, with the flasher parts disposed as in Fig. 4, when the electrical plug 38 of the appliance's electrical cord 36 is connected to a source of electricity and the manual switch 34 is opened, energization of the heating unit 22 is controlled by the flasher 28. The contacts 54 and 58 are engaged and current flows through the flasher and the heating unit, and the latter heats up. The principal bimetallic member 30 heats up quickly, principally in response to the heat emitted directly from the heating unit 22, whereas the first bimetallic member 42 and the second bimetallic member 44 heat up relatively slowly, principally in response to ambient heat, because of the fact that they are shielded from the heating unit. Since all of the bimetallic members carry current, some self-heating will occur; this is not significant except in the case of the second bimetallic member. The principal bimetallic member 30 is designed to move the contact 58 out of engagement with the contact 54 shortly after energization of the heating unit 22; this occurs at an ambient temperature which is considerably lower than the preselected warming temperature at which the flasher will cycle. Hence, the heating unit is not energized for very long during its first energization period.

It should be noted that some deflection in both the first and second bimetallic members will have occurred at the time of the first disengagement of the contacts. This is indicated schematically and in an exaggerated manner in Fig. 7 by illustrating the initial cold condition of the flasher parts in solid lines, and their position at the time of the first disengagement of the contacts in dotted lines. Disengagement of the contacts 54 and 58 results in de-energization of the heating unit 22, and the flasher cools down. The principal bimetallic member 30 cools down more quickly than the first bimetallic member 42, which effects most of the deflection of the bimetallic compensating assembly and, therefore, undeflects and causes the contacts 54 and 58 to re-engage before the first bimetallic member 42 completely straightens out. In other words, the contacts are re-engaged at a higher ambient temperature than the original cold ambient temperature of the appliance.

Engagement of the contacts results in energization of the heating unit 22 and further heating in the appliance, hence, further deflection of the bimetallic members in the flasher. Again, due to the fact that the principal bimetallic member 30 responds to heat emitted directly from the heating unit 22, it deflects more quickly than the first and second bimetallic members, and the contacts are disengaged again. This condition occurs at a higher ambient temperature than that at the time of the first disengagement of the contacts, and it is shown in dot-dash lines in Fig. 7. Disengagement of the contacts again de-energizes the heating unit 22, and results in cooling of the flasher again. Here again, the principal bimetallic member cools more quickly than the first and second bimetallic members, and the contacts will be re-engaged a second time at a higher ambient temperature than either the initial cold temperature or the temperature at which the contacts were re-engaged the first time.

The process of sequential operation just described continues until the first bimetallic member 42 has deflected to the maximum in accordance with its physical characteristics. The temperature at which this maximum deflection occurs is the preselected temperature about which the flasher will cycle and, hence, the warming temperature of the appliance. Because of its sequential manner of operating, the flasher contemplated by the instant invention is able to control a heating unit from an initial cold appliance condition up to the preselected warming temperature for the appliance without allowing the heating unit to be on continuously for any appreciable length of time, thereby eliminating any substantial cooking of food objects placed in the appliance to be warmed. It should be particularly noted that the initial "On" periods of the heating unit are maintained at a minimum because of the manner in which the flasher operates.

Whereas the second bimetallic member 44 also deflects during the operation of the flasher in the same general manner as the first bimetallic member 42, due to the relatively small mass of said second bimetallic member, the flasher's sequential manner of operating is substantially provided by the first bimetallic member and the principal bimetallic member. The second bimetallic member 44 functions principally to eliminate slow engagement and disengagement of the contacts 54 and 58 by effecting quick separation of the contacts when disengagement occurs and by insuring good physical contact between the contacts when they are engaged. This desirable operation is effected by the second bimetallic member, and is due largely to the material of which it is made and its relative size and shape. As was previously mentioned, the second bimetallic member is selected of a material having a high coefficient of electrical resistivity and, hence, one which quickly self-heats itself and deflects rapidly upon a flow of current through it. As was previously pointed out, all of the bimetallic members of the flasher are current carrying members. Therefore, they are all self-heated to some extent by the flow of current and the resistivity of the material of which they are made. However, in view of the fact that the second bimetallic member is intentionally selected of a material having a high coefficient of resistivity, it will deflect to a greater extent than the other bimetallic members when current flows through them. Further, due to its size and shape, and particularly its small cross-section, the deflection which results from self-heating upon current flowing through it is increased further relative to the other bimetallic members.

Therefore, whenever the contacts 54 and 58 are engaged, current flows through the bimetallic members, and the second bimetallic member 44 self heats and deflects in a direction to cause its contact 54 to press against the contact 58, thereby insuring a good electrical connection. Upon disengagement of the contacts, current ceases to flow through the second bimetallic member 44 and, therefore, it cools off and undeflects rapidly, and increases the gap between the contacts, resulting in quick contact separation. Contact separation results in de-energization of the heating unit 22 and in cooling of the flasher parts. Upon sufficient cooling of the principal bimetallic member 30, the contacts engage again; the instant the contacts engage, current flows through the second bimetallic member 44 and a considerable amount of self-heating immediately occurs, which results in rapid deflection of the second bimetallic member so as to press the contact 54 tightly into engagement with the contact 58.

It will be understood that during normal operation of the flasher the sequential heat-up of the appliance will result from the intermittent energization of the heating unit 22 up to the preselected warming temperature without the heating unit being "On" for any appreciable period of time during the initial warm-up of the appliance, and further that this operating effect is primarily contributed by the first bimetallic member and the principal bimetallic member. During the operation of the flasher, the second bimetallic member functions in the described manner to eliminate slow engagement and disengagement of the contacts and to insure a good electrical connection between the contacts when they are engaged, thereby reducing arcing between the contacts on engagement and disengagement, and eliminating the resultant radio noises and shortening of the contacts' lives. The preselected warming temperature may be varied by changing the initial pressure between the contacts 54 and 58; this may be effected by bending the brackets 40 and 56. However, it is not intended that adjustment of the preselected warming temperature will normally be made by the ultimate user of the appliance equipped with the flasher; such adjustment will normally be performed at the factory.

In view of the foregoing, it will be apparent that an improved control has been provided for an electrical cooking appliance having a single heating unit which selectively may be energized either (1) continuously to cook objects placed in the appliance by closing a manual switch so as to short out a flasher in the control, or (2) intermittently to warm food objects placed in the appliance by opening the manual switch to place the flasher in the heating unit circuit. It will be apparent further that a new and improved flasher construction has been provided which operates in a novel manner to control the appliance temperature by intermittently energizing the heating unit and cycling about a preselected temperature, such cycling, however, not being rapid and not producing the consequential objectionable radio noise; further, that the flasher operates with reduced initial periods during which the heater is energized, thereby precluding the unintentional and undesired cooking of objects placed in the appliance to be warmed, and lastly, that the flasher operates to eliminate slow engagement and disengagement of the contacts, and thereby eliminates arcing between the contacts which produces undesirable radio noise and in a significant way reduces the life of the contacts.

As will be evident from the foregoing description, certain aspects of the invention are not limited to the particular details of construction of the example illustrated, and we contemplate that various and other modifications and applications will occur to those skilled in the art. It is, therefore, our intention that the appended claims shall cover such modifications and applications as do not depart from the true spirit and scope of the invention.

What we claim as new and desire to secure by Letters Patent of the United States is:

1. The combination of an electrical heating unit, electrical wiring forming an electrical circuit with said heating unit therein, a flasher in the form of a thermally responsive switch in said circuit for intermittently opening and closing said circuit in response to temperature changes and thereby intermittently deenergizing and energizing said unit, a manual two-position switch which is manually movable to either position for selectively either shorting said flasher out of the circuit or leaving said flasher in the circuit, whereby said heating unit may be selectively energized either continuously or intermittently, and wherein said flasher comprises a principal bimetallic member and a bimetallic compensating assembly, and said flasher is disposed in such a manner that the principal bimetallic member faces said heating unit and said bimetallic compensating assembly is shielded from said heating unit.

2. A cooking appliance comprising an oven, an electrical heating unit in said oven, a flasher in the form of a thermally responsive switch in said oven, electrical wiring forming an electrical circuit with said heating unit and flasher therein, said flasher operating in response to temperature changes in said oven to open and close said circuit to thereby intermittently energize said heating unit to maintain a preselected temperature in said oven whereby food may be warmed therein, and a manual switch which is manually movable to either one position wherein said flasher is operative in the circuit to intermittently energize said heating unit or another position wherein said flasher is shorted out of the circuit to thereby cause said heating unit to be continuously energized whereby food may be cooked in said oven, said flasher comprising a principal bimetallic member and a bimetallic compensating assembly, and said flasher being disposed in said oven in such a manner that said principal bimetallic member faces said heating unit, and said bimetallic compensating assembly is shielded from said heating unit, whereby said principal bimetallic member responds to heat emitted directly from said heating unit, and said bimetallic compensating assembly responds to ambient heat in said oven.

3. A device as defined in claim 2 wherein said bimetallic compensating assembly deflects in response to increases in the ambient temperature in said oven only up to a predetermined temperature.

4. The combination of an electrical heating unit and a flasher, said flasher comprising a principal bimetallic member and a bimetallic compensating assembly, said principal bimetallic member supporting an electrical contact at one end, said bimetallic compensating assembly comprising a bimetallic member and supporting an electrical contact disposed adjacent to said first mentioned electrical contact, said contacts adapted to engage and disengage to respectively energize and de-energize said heating unit, said bimetallic members having their high expansion sides facing away from said heating unit, said principal bimetallic member being disposed between said assembly bimetallic member and said heating unit, and thereby shielding the former from the latter, said bimetallic members deflecting toward said heating unit on being heated, said principal bimetallic member responding to heat emitted directly from said heating unit and deflecting to a greater extent during the same period than said assembly bimetallic member which responds to the ambient heat thereby causing disengagement of said contacts and de-energizing said heating unit, said principal bimetallic member on de-energization of said heating unit cooling and undeflecting more rapidly than said assembly bimetallic member and thereby causing engagement of said contacts, such engagement occurring at a higher ambient temperature than that at the time of initial engagement of the contact, whereby said contacts are intermittently engaged and disengaged to intermittently energize and de-energize said heating unit, resulting in a sequential increase in the ambient temperature around the flasher without allowing the heating unit to be energized continuously for any appreciable amount of time.

5. The combination defined in claim 4 wherein said assembly bimetallic member is made of a material which deflects in response to temperature increases only up to a predetermined temperature, whereby said flasher intermittently energizes said heating unit up to said predetermined temperature and then cycles about the latter.

6. The combination defined in claim 4 wherein said bimetallic compensating assembly includes a second bimetallic member which carries said second mentioned electrical contact, which has its high expansion side facing in the same direction as the other bimetallic members, which is made of a material having a high coefficient of electrical resistivity relative to the other bimetallic members, and which is of small mass relative to the other bimetallic members, whereby said second bimetallic member self-heats rapidly when current flows therethrough and deflects rapidly in a direction to press its electrical contact against the electrical contact carried by said principal bimetallic member to thereby insure a good electrical connection, and whereby said second bimetallic member cools down rapidly when said contacts are disengaged and rapidly undeflects to thereby increase the gap between the contacts to insure quick separation and eliminate arcing between the contacts.

7. The combination of an electrical heating unit and a flasher, said flasher comprising a principal bimetallic member and a bimetallic compensating assembly, said principal bimetallic member and said assembly being elongated, spaced and generally parallel to each other, said assembly comprising a first bimetallic member and a second bimetallic member which are aligned longitudinally and have abutting ends, said abutting ends being joined to thereby form said elongated assembly, said first bimetallic member being supported at its non-abutting end, said second bimetallic member supporting an electrical contact at its free end, said bimetallic members having their high expansion sides facing away from said heating unit and adapted to deflect toward said heating unit in response to increases in their temperature, said principal bimetallic member being disposed between said heating unit and said bimetallic compensating assembly and being of such size and shape as to substantially shield said assembly from said heating unit, whereby said principal bimetallic assembly responds principally to heat emitted directly from said heating unit, whereas said assembly is shielded from said heating unit and reacts primarily to ambient heat, said principal bimetallic member being supported at one end and supporting an electrical contact at its other end which is adjacent to said first mentioned contact, said first bimetallic member comprising the major portion of said bimetallic compensating assembly and being made of a material which deflects in response to temperature increases only up to a predetermined temperature, said second bimetallic member being made of a material having a high coefficient of electrical resistivity and being of small mass relative to the other bimetallic members, whereby said second bimetallic member self-heats rapidly when the contacts are engaged and current flows through it and thereby deflects rapidly in a direction to press its electrical contact against the other contact to thereby insure a good electrical connection, and whereby said second bimetallic member cools down rapidly when said contacts are disengaged and undeflects rapidly to thereby increase the gap between the contacts to insure quick separation and eliminate arcing between the contacts, the entire arrangement being such that when in cold condition and connected to a source of electricity, the parts are disposed so that the contacts are engaged, thereby causing current to flow through the bimetallic members and energize the heating unit, whereby the bimetallic members are heated and deflect toward said unit, said principal bimetallic member being the only bimetallic member which responds principally to heat emitted directly from said heating unit deflects more than said bimetallic compensating assembly and results quickly in disengagement of the contacts and deenergization of said heating unit, the latter results in undeflection of said bimetallic members and re-engagement of said contacts at a higher ambient temperature than the initial temperature, the intermittent engagement and disengagement of said contacts results in intermittent energization and de-energization of said heating unit with a consequential sequential increase in ambient temperature up to the predetermined temperature to which the first bimetallic member deflects, at which temperature the flasher cycles, the overall operation being such that the heating unit is never on continuously for any prolonged period of time during initial operation of the flasher, the flasher cycles slowly when the ambient temperature reaches said predetermined temperature, and said contacts engage and disengage quickly when changing their condition.

References Cited in the file of this patent
UNITED STATES PATENTS

| | | |
|---|---|---|
| 1,916,671 | Hanser et al. | July 4, 1933 |
| 2,371,018 | Ashworth et al. | Mar. 6, 1945 |
| 2,399,423 | Bletz | Apr. 30, 1946 |
| 2,410,014 | Clark | Oct. 29, 1946 |
| 2,422,526 | Burch | June 17, 1947 |
| 2,427,945 | Clark et al. | Sept. 23, 1947 |
| 2,611,070 | Chandler | Sept. 16, 1952 |
| 2,742,547 | Chang-Kaing Tsi | Apr. 17, 1956 |
| 2,798,132 | Collier | July 2, 1957 |
| 2,798,929 | Wojcik | July 9, 1957 |